US011460845B2

(12) United States Patent
Levasseur

(10) Patent No.: US 11,460,845 B2
(45) Date of Patent: Oct. 4, 2022

(54) LOGISTICS FACILITY MANAGEMENT SYSTEM

(71) Applicant: Autoguide LLC, Chelmsford, MA (US)

(72) Inventor: David Levasseur, Wilmington, MA (US)

(73) Assignee: Teradyne, Inc., North Reading, MA (US)

( * ) Notice: Subject to any disclaimer, the term of this patent is extended or adjusted under 35 U.S.C. 154(b) by 320 days.

(21) Appl. No.: 16/841,331

(22) Filed: Apr. 6, 2020

(65) Prior Publication Data

US 2021/0011479 A1 Jan. 14, 2021

Related U.S. Application Data

(60) Provisional application No. 62/833,448, filed on Apr. 12, 2019.

(51) Int. Cl.
*G01C 22/00* (2006.01)
*G05D 1/02* (2020.01)
(Continued)

(52) U.S. Cl.
CPC ............. *G05D 1/021* (2013.01); *B60K 35/00* (2013.01); *B60L 53/12* (2019.02); *G01C 21/206* (2013.01);
(Continued)

(58) Field of Classification Search
CPC ................. G05D 1/021; G05D 2201/0216; B60L 53/12; B60K 35/00; G01C 21/206; G06Q 50/28
See application file for complete search history.

(56) References Cited

U.S. PATENT DOCUMENTS

2017/0283171 A1 10/2017 High et al.

FOREIGN PATENT DOCUMENTS

| CN | 108202965 A | * | 6/2018 |
| JP | 2019530625 A | * | 10/2017 |
| WO | 2015035300 | | 3/2015 |

OTHER PUBLICATIONS

Adept Technology, Inc., Adept Lynx Platform User's Guide; Manual Publication [Online], Jan. 2015, pp. 1-91, Retrieved from the Internet:<URL: https://www.manualslib.com/manual/1171544/Adept-Technology-Lynx-Platform.html, Pleasanton, United States.

* cited by examiner

*Primary Examiner* — Adam M Alharbi
(74) *Attorney, Agent, or Firm* — Perman & Green LLP

(57) ABSTRACT

An automated mobile vehicle (AMV) including a frame forming a pallet bed for a pallet, and having an automated mobile robot bus, separate and distinct from the pallet bed, a drive section coupled to the frame to provide automated vehicle mobility, and a controller operably coupled to the drive section to effect automated vehicle mobility, wherein, the robot bus has a bus interface for docking independent automated mobile robots (AMR) to the frame so that the AMR is carried by the frame, wherein the AMR has independent automated mobility so that undocked from the frame, the AMR is free to roam independent from the AMV, and wherein the AMR is fungible for docking with the frame from a number different AMRs, to effect a predetermined material handling characteristic, and wherein the controller is coupled to the AMR to manage control of the predetermined material handling characteristic with the AMR undocked from the frame and moving as a unit apart from the frame.

46 Claims, 13 Drawing Sheets

(51) Int. Cl.
  *B60L 53/12* (2019.01)
  *B60K 35/00* (2006.01)
  *G01C 21/20* (2006.01)
  *G06Q 50/28* (2012.01)
(52) U.S. Cl.
  CPC ..... *G06Q 50/28* (2013.01); *G05D 2201/0216* (2013.01)

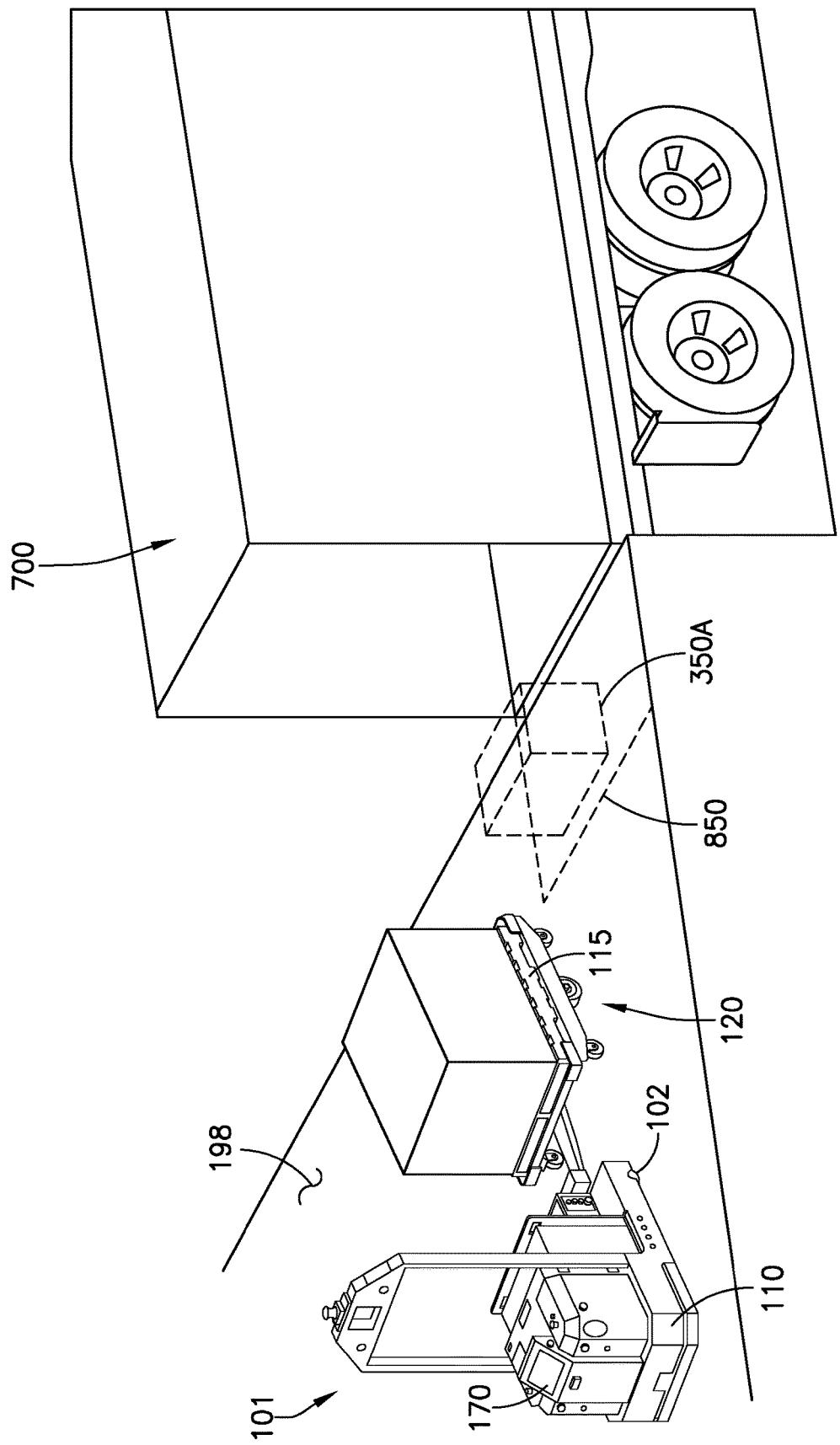

LOGISTICS FACILITY MANAGEMENT SYSTEM

CROSS-REFERENCE TO RELATED APPLICATION

This application is a non-provisional of and claims the benefit of U.S. provisional patent application No. 62/833,448 filed on Apr. 12, 2019 and entitled "Logistics Facility Management System", the disclosure of which is incorporated herein by reference in its entirety.

BACKGROUND

1. Field

The exemplary embodiments generally relate to logistics and material handling in a commercial logistic facility, more particularly, to automated mobile vehicle logistics and material handling.

2. Brief Description of Related Developments

Generally transportation of articles in a commercial logistics facility is done with manually operated or automated transport equipment such as fork lift-trucks, pallet jack-trucks, etc. The transport equipment travels between various storage locations with articles supported on the transport equipment so that the articles may be stored in the storage locations. Upon reaching a designated storage location, human operators unload the articles from the transport equipment to store the articles in the designated storage location.

BRIEF DESCRIPTION OF THE DRAWINGS

The foregoing aspects and other features of the disclosed embodiment are explained in the following description, taken in connection with the accompanying drawings, wherein:

FIG. 3 is a perspective illustration of a portion of the logistic management system of FIG. 1 in accordance with aspects of the disclosed embodiments;

DETAILED DESCRIPTION

It would be advantageous to have a logistics management system that collaborates automated mobile vehicles (AMV) with fungible automated mobile robots (AMR) to handle and transport articles throughout a logistic facility.

Figure 1:
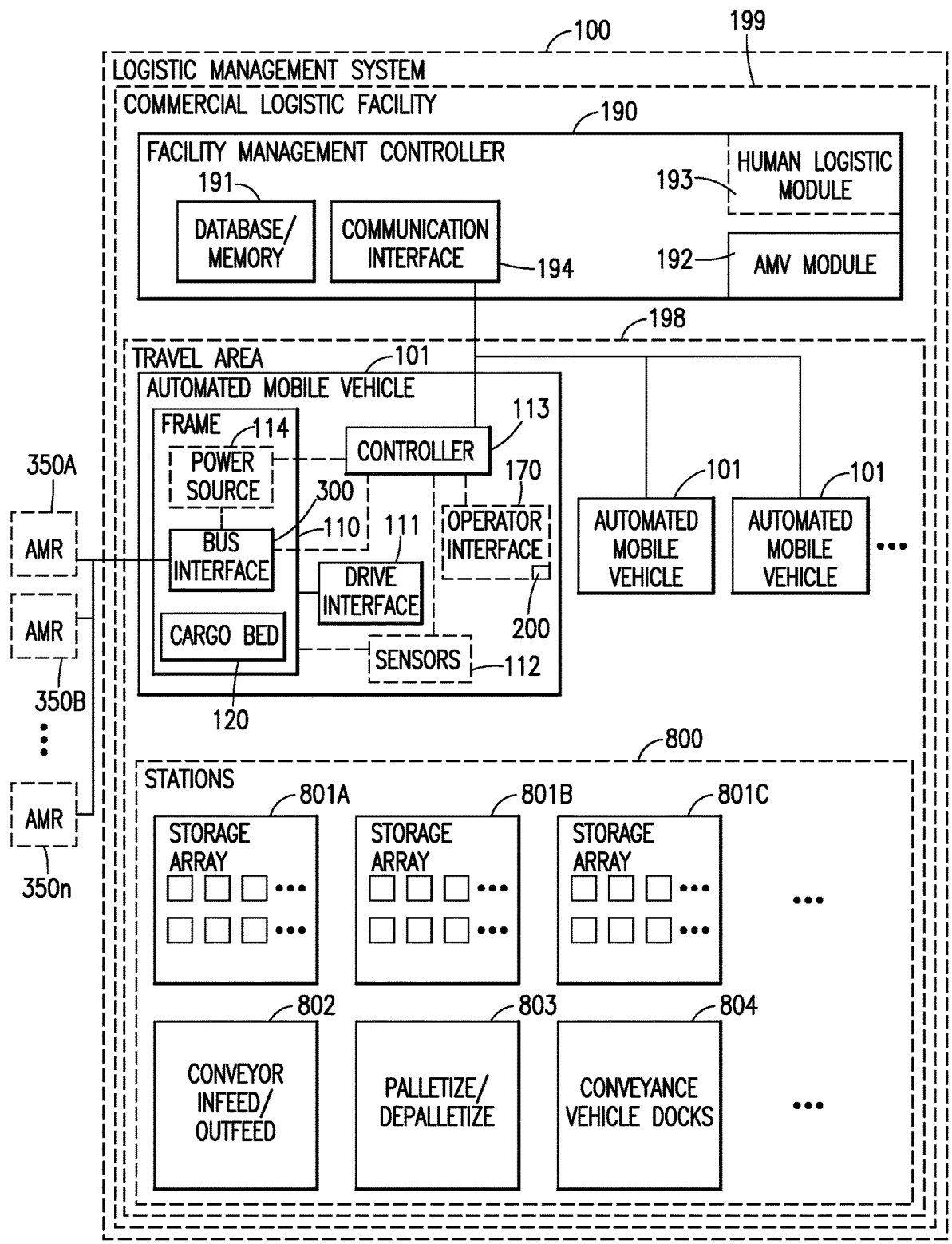
FIG. 1 is a block diagram illustrating an logistic management system in accordance with aspects of the disclosed embodiments.
Figure 2A:
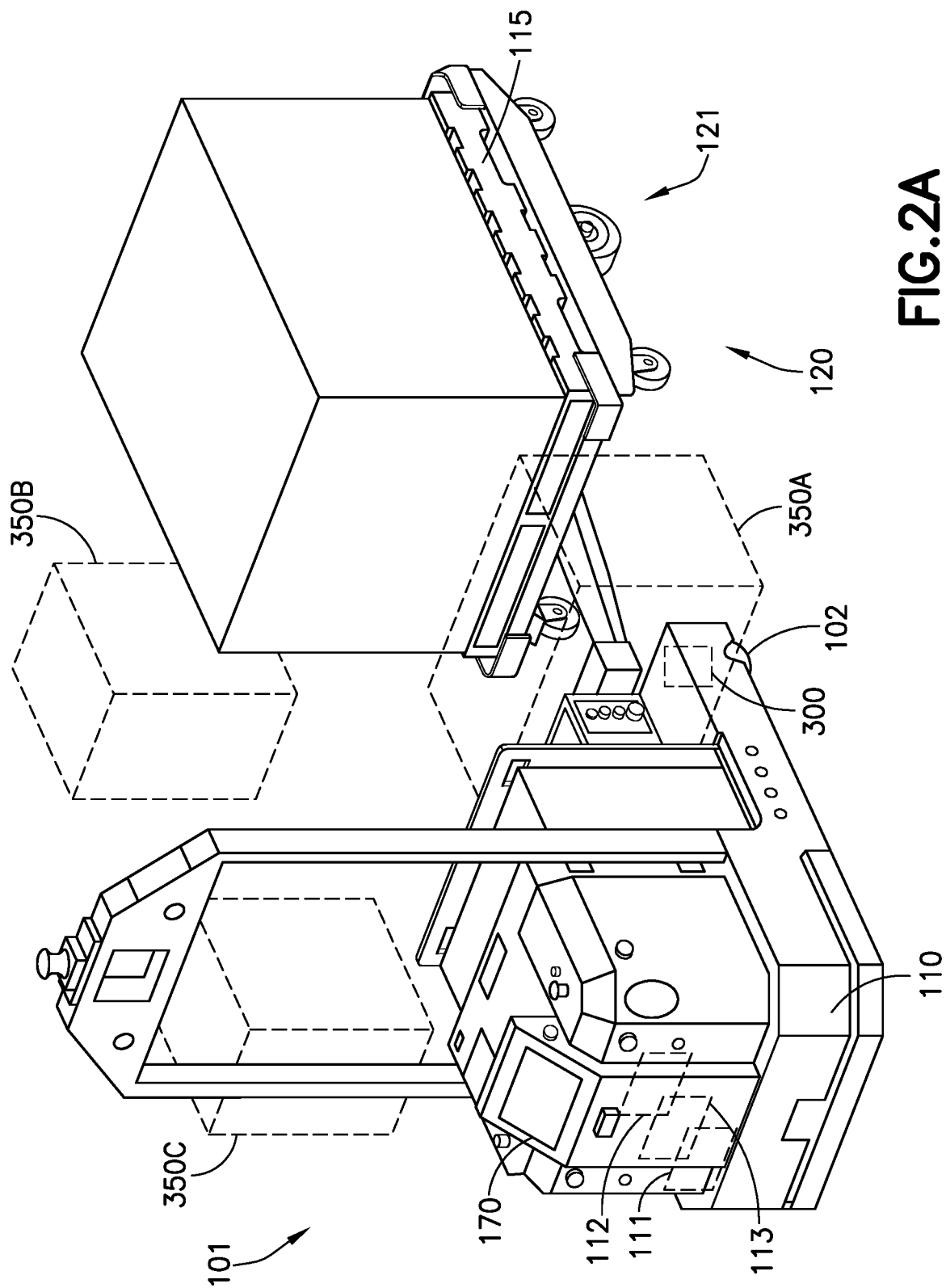
FIG. 2A is a perspective illustration of an automated mobile vehicle utilized in the logistic management system of FIG. 1 in accordance with aspects of the disclosed embodiments.
Figure 2B:
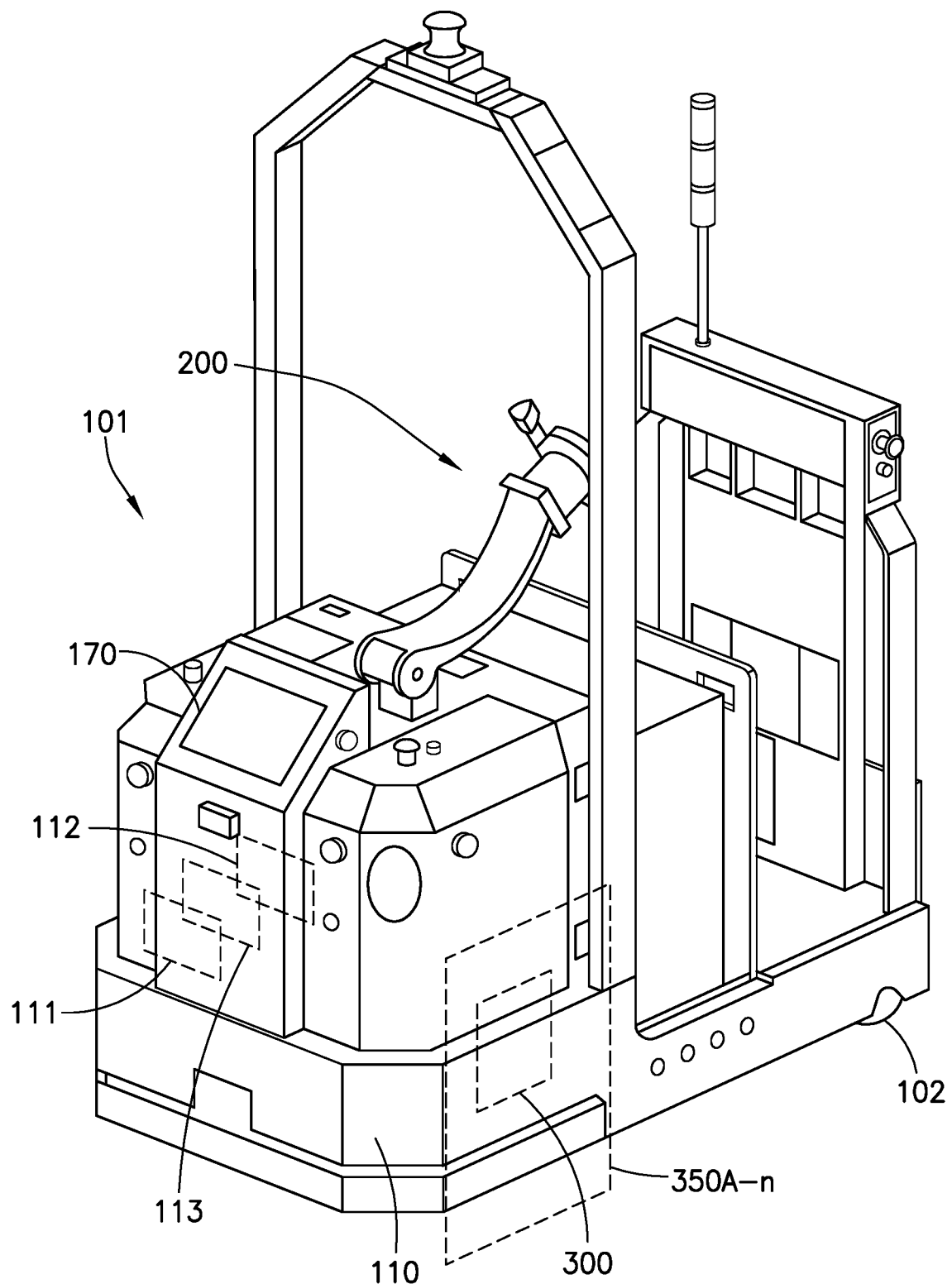
FIG. 2B is a perspective illustration of an automated mobile vehicle utilized in the logistic management system of FIG. 1 in accordance with aspects of the disclosed embodiments.
Figure 2C:
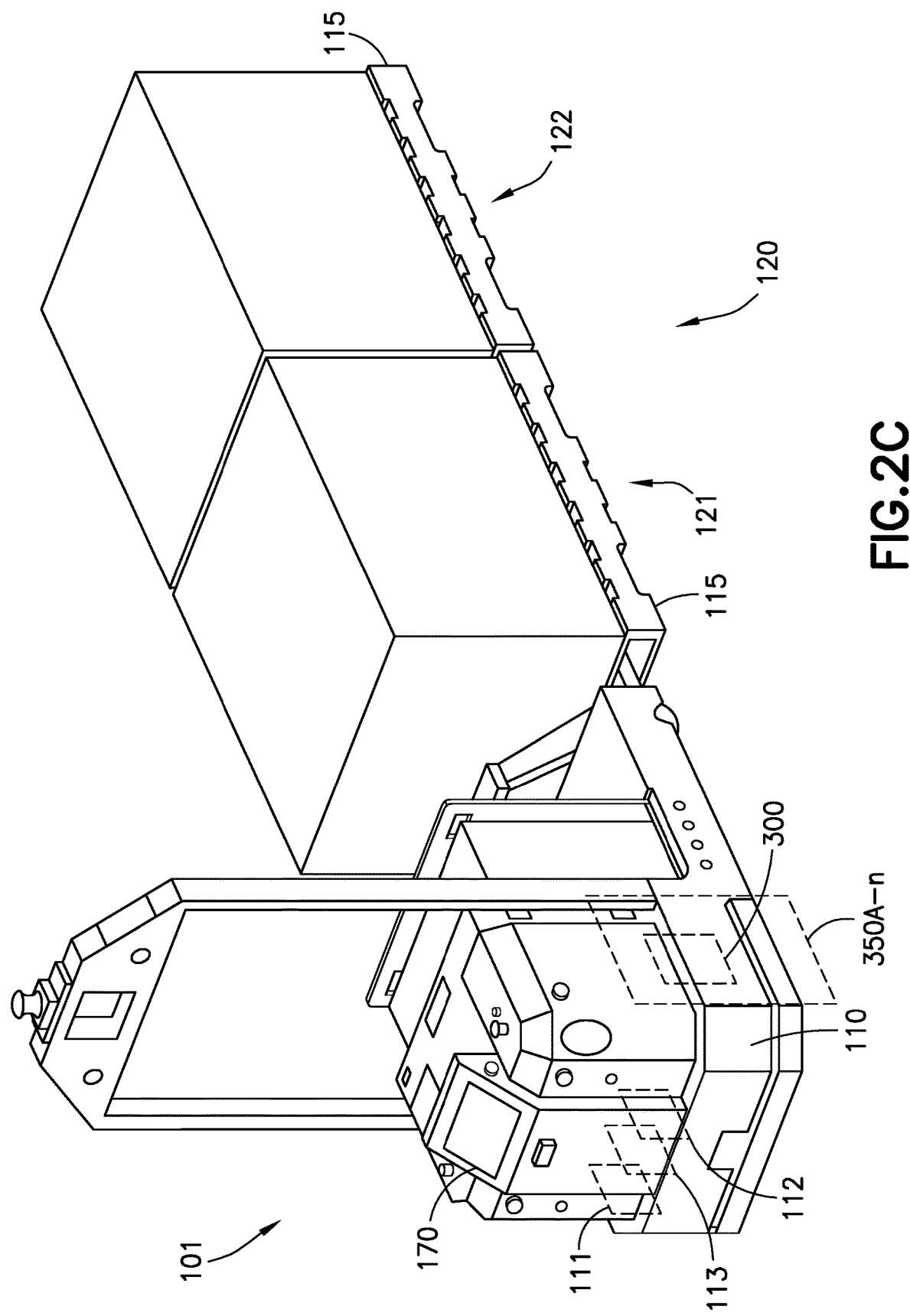
FIG. 2C is a perspective illustration of an automated mobile vehicle utilized in the logistic management system of FIG. 1 in accordance with aspects of the disclosed embodiments.
Figure 2D:
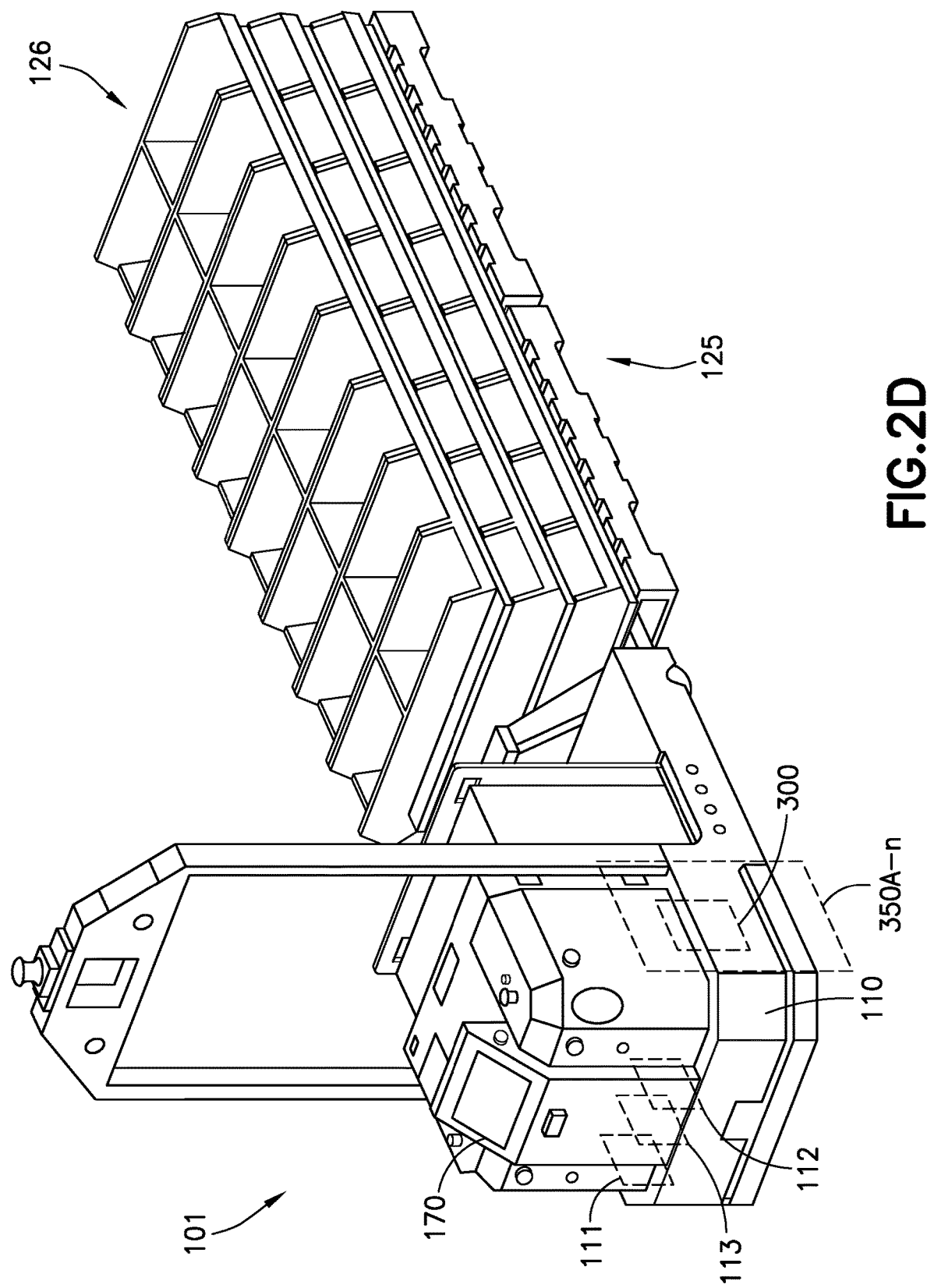
FIG. 2D is a perspective illustration of an automated mobile vehicle utilized in the logistic management system of FIG. 1 in accordance with aspects of the disclosed embodiments.

Referring to FIG. 1, a logistics management system 100 is illustrated in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The logistics management system 100 is configured for managing logistic and/or material handling in a commercial logistic facility 199. Examples of the commercial logistic facility 199 include, but are not limited to, warehouses, stores, storage facilities, distribution facilities, production/assembly facilities, etc. It should be understood that the logistics management system 100 may manage any suitable transport of articles depending on the type of facility and any type of facility explicitly mentioned herein is for exemplary purposes only.

The logistics management system 100 includes at least a facility management controller 190 and at least one automated mobile vehicle 101 to perform material handling tasks in the commercial logistic facility 199. The facility management controller 190 may be any suitable manufacturing execution system or warehouse management system (see, e.g., FIG. 9) that interfaces with the at least one automated mobile vehicle 101 for managing logistic execution and/or material handling tasks in the commercial logistic facility 199. In one aspect, the facility management controller 190 directs the real-time activities within the commercial logistic facility 199 and includes any suitable components such as, for example, one or more of a database/memory 191, an AMV module 192, a human logistic module 193, a communication interface 194, etc. to manage the logistic execution and/or material handling tasks as will be further described herein.

Referring now to FIGS. 1, 2A-2D, and 3, the automated mobile vehicle 101 generally includes at least a frame 110, a drive section 111, and a controller 113. The automated mobile vehicle 101 may also include sensors 112 that are integrated with both the drive section 111 and the controller 113 to effect autonomous navigation of the automated mobile vehicle 101. The automated mobile vehicle 101 is configured to traverse a travel area 198 in the commercial logistic facility 199 to transport objects to/from or between different stations 800 in the commercial logistic facility 199. In one aspect, the travel area 198 forms a logistic space of the commercial logistic facility 199; while in other aspects the travel area 198 forms any suitable space of the commercial logistic facility 199.

Generally, the frame 110 of the automated mobile vehicle 101 forms a cargo bed 120 and includes at least an automated mobile robot bus interface 300 dependent from the frame 110 and disposed so as to engage independent automated mobile robots 350A-n as will be further described below. In one aspect, the cargo bed 120 defines a pallet holding location 121 for supporting a pallet 115 (FIG. 2A); in other aspects, the cargo bed 120 may include any suitable structure for holding/supporting palletized articles, racks of articles, individual articles, bundles of articles, assemblies of articles, etc. such as, for example, a bedstead 125 having an arrayed cradle 126 (FIG. 2D), or any other suitable cargo hold. In one aspect, the cargo bed 120 defines more than one pallet holding location 121, 122 for simultaneously holding more than one pallet 115 on the cargo bed 120. The drive section 111 is coupled to the frame 110 and may include any suitable motor(s) configured to drive one or more wheels 102 or tracks and provide mobility of the automated mobile vehicle 101. The motor(s) may drive the one or more wheels 102 or tracks either directly or through any suitable transmission, so that the automated mobile vehicle 101 traverses the travel area 198. An example of an automated mobile vehicle 101 is the AutoGuide MAX N10 mobile robot platform available from Heartland Automation, though any suitable automated mobile vehicle may be used.

The controller 113 of the automated mobile vehicle 101 is operably coupled to the drive section 111 so as to effect therewith vehicle mobility. The controller 113 may be any suitable control system that is configured with any suitable programming for effecting operation of the automated mobile vehicle 101 as described herein. The controller 113 may be configured, such as through wireless communications, to communicate with the communication interface 194 of the facility management controller 190 to effect autonomous operation of the automated mobile vehicle 101. For example, the automated mobile vehicle 101 may be configured to receive, and the facility management controller 190 may be configured to send, commands that instruct the automated mobile vehicle 101 to perform predetermined material handling tasks within the commercial logistic facility 199. Such material handling tasks include but are not limited to, transporting articles, storing articles, palletizing and/or depalletizing the pallets 115, loading conveyance vehicle(s) 700 (FIG. 3), or any other suitable task for the automated mobile vehicle 101 to perform.

In one aspect, the sensors 112 are operably coupled to the controller 113. The sensors 112 may be any suitable sensors that are disposed at any suitable locations on the automated mobile vehicle 101 to effect autonomous navigation of the automated mobile vehicle 101 throughout the travel area 198. The sensors 112 may be any suitable sensor including, but not limited to, one or more of optical sensors, acoustic sensors, capacitive sensors, radio-frequency sensors, cameras (e.g., time of flight cameras, imaging cameras, etc.), and/or any other suitable sensor(s) that provides, for example, the detection of obstacles, articles, personnel, and/or docking stations within the commercial logistic facility 199. The automated mobile vehicle 101 is configured for autonomous navigation throughout the travel area 198, from any start location to any end destination location in the travel area 198. For example, the automated mobile vehicle 101 (via the sensors 112 and the controller 113) may rely on inherent structure (e.g., storage areas, assembly robots, conveyors, assembly stations, etc.) of the commercial logistic facility 199 or navigation infrastructure (e.g., lines, radio/electromagnetic beacons, magnets, codified marks/tape, etc.) for navigating through the travel area 198. The AMV module 192 of the facility management controller 190, in one aspect, may determine the destination of the automated mobile vehicle (i.e., controls the movement of the at least one automated mobile vehicle 101) within the commercial logistic facility 199 and commands, via the controller 113, the at least one automated mobile vehicle 101 to perform, at a facility station 800, a selected material handling task.

Referring again to FIG. 1, as noted above, the frame 110 of the automated mobile vehicle 101 includes the automated mobile robot bus interface 300 for engaging/docking the independent automated mobile robots 350A-n to the frame 110. It should be understood that the independent automated mobile robots 350A-n may be any suitable robot and are fungible for docking with the frame 110 from a number of different independent automated mobile robots 350A-n. The independent automated mobile robots 350A-n may have any suitable predetermined material handling characteristic. For example, the independent automated mobile robots 350A may include a robot arm with any suitable end of arm tooling, such as gripping, drilling, welding, vacuum suction, etc. for interfacing with articles or structures throughout the commercial logistic facility 199 (i.e., automated mobile robot 350A may include a robot arm having a predetermined material handling characteristic of gripping which may be utilized to palletize/depalletize the pallet 115 supported on the cargo bed 120 of the automated mobile vehicle 101).

The automated mobile robot bus interface 300 may be any suitable coupling (e.g., one or more of a mechanical coupling, electrical connections, mechatronic coupling, etc.) to releasably couple the independent automated mobile robot 350A-n to the frame 110 of the automated mobile vehicle 101, so that the independent automated mobile robot 350A-n docked to the frame 110 is carried by the frame 110 during movement of the automated mobile vehicle 101. In one aspect, the automated mobile robot bus interface 300 is a fully autonomous coupling that automatically couples with and decouples the automated mobile robot 350A-n (e.g., under the control of the controller 113); however, in other aspects the automated mobile robot bus interface 300 may also be configured for semi-autonomous or manual coupling and decoupling of the automated mobile robot 350A-n. For example, in one aspect, the automated mobile vehicle 101 may include a tow hitch to which the automated mobile robot 350A-n attaches to so as to be towed by the automated mobile vehicle 101; while in other aspects, the automated mobile robot 350A-n may be directly supported on the frame 110 of the automated mobile vehicle 101. The automated mobile robot 350A-n may be coupled to the automated mobile vehicle 101 at any suitable time. In one aspect, the automated mobile robot bus interface 300, via the controller 113, is configured so as to provide one or more of a transfer of power, data, and commands between the automated mobile vehicle 101 and the automated mobile robot 350A-n.

In one aspect, the facility management controller 190 of the commercial logistic facility 199 is configured to associate, based on a selected material handling task, the automated mobile robot 350A-n with the at least one automated mobile vehicle 101. As noted above, the automated mobile robots 350A-n are fungible from a number of different automated mobile robots 350A-n such that the facility management controller 190 may identify/determine an optimal automated mobile robot 350A-n to associate with the automated mobile vehicle 101 to complete the selected material handling task. The optimal automated mobile robot 350A-n may be selected based on the predetermined material handling characteristic of the automated mobile robot 350A-n. In one aspect, the facility management controller 190 may rely on additional factors when determining an optimal automated mobile robot 350A-n, such as location, battery life, whether the robot is currently performing another task and how long the task may last, etc. Coupling of the optimal automated mobile robot 350A-n with the automated mobile robot bus interface 300 configures the automated mobile vehicle 101 to carry the automated mobile robot 350A-n with the identified predetermined material handling characteristic to perform the selected material handling task commanded by the facility management controller 190.

In another aspect, the controller 113 of the automated mobile vehicle 101 may be configured so as to associate the automated mobile robot 350A-n, from the different fungible automated mobile robots 350A-n, with the automated mobile vehicle 101 based on the predetermined material handling characteristic of the automated mobile robot 350A-n. For example, where the automated mobile robot 350A-n may not have wireless communication capabilities, the automated mobile robot bus interface 300 may also be a configured as a data communication coupling to provide communication between the automated mobile robot 350A-n and the controller 113 of the automated mobile vehicle 101 for transferring commands from the controller 113 to the automated mobile robot 350A-n. In this aspect, the facility management controller 190 provides the controller 113 of the automated mobile vehicle 101 with the material handling task and identifies to the controller 113 the predetermined material handling characteristic for completing the material handling task.

Still referring to FIG. 1, in one aspect, the automated mobile robot bus interface 300 and the controller 113 are communicably coupled and configured so as to allow the controller 113 to automatically (or in other aspects, manually) register the automated mobile robot 350A-n coupled with the automated mobile robot bus interface 300. For example, upon coupling of the automated mobile robot 350A-n with the automated mobile robot bus interface 300, the automated mobile robot bus interface 300 sends a signal to the controller 113 identifying the automated mobile robot 350A-n. In other aspects, the automated mobile robot bus interface 300 may include any suitable sensors that interact (either with contact or without contact) the automated mobile robot 350A-n to identify the automated mobile robot 350A-n. The controller 113 may register the identification of the automated mobile robot 350A-n in any suitable memory of the controller 113 or may send the identification to the facility management controller 190. To change the predetermined material handling characteristic from a first predetermined material handling characteristic of the automated mobile robot 350A-n to a different predetermined material handling characteristic of another automated mobile robot, the controller 113 of the automated mobile vehicle 101 disassociates the automated mobile robot 350A-n from the automated mobile vehicle 101. After disassociating the automated mobile robot 350A-n from the automated mobile vehicle 101, the controller is free to associate the automated mobile vehicle 101 with any other automated mobile robot having a different predetermined material handling characteristic.

Figure 9:
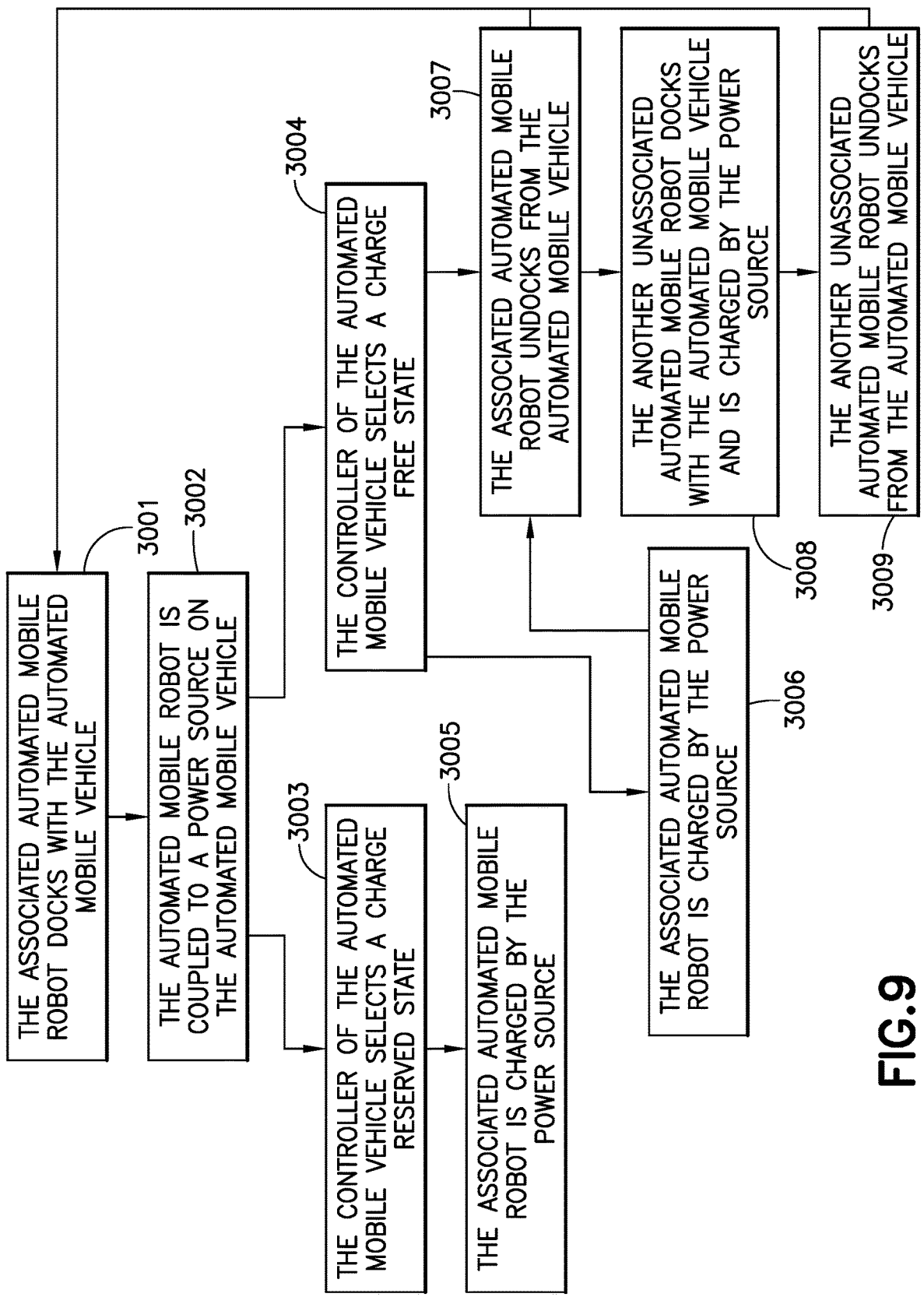
FIG. 9 is a flow diagram illustrating the logistic management system of FIG. 1 in accordance with aspects of the disclosed embodiments.
Figure 10:
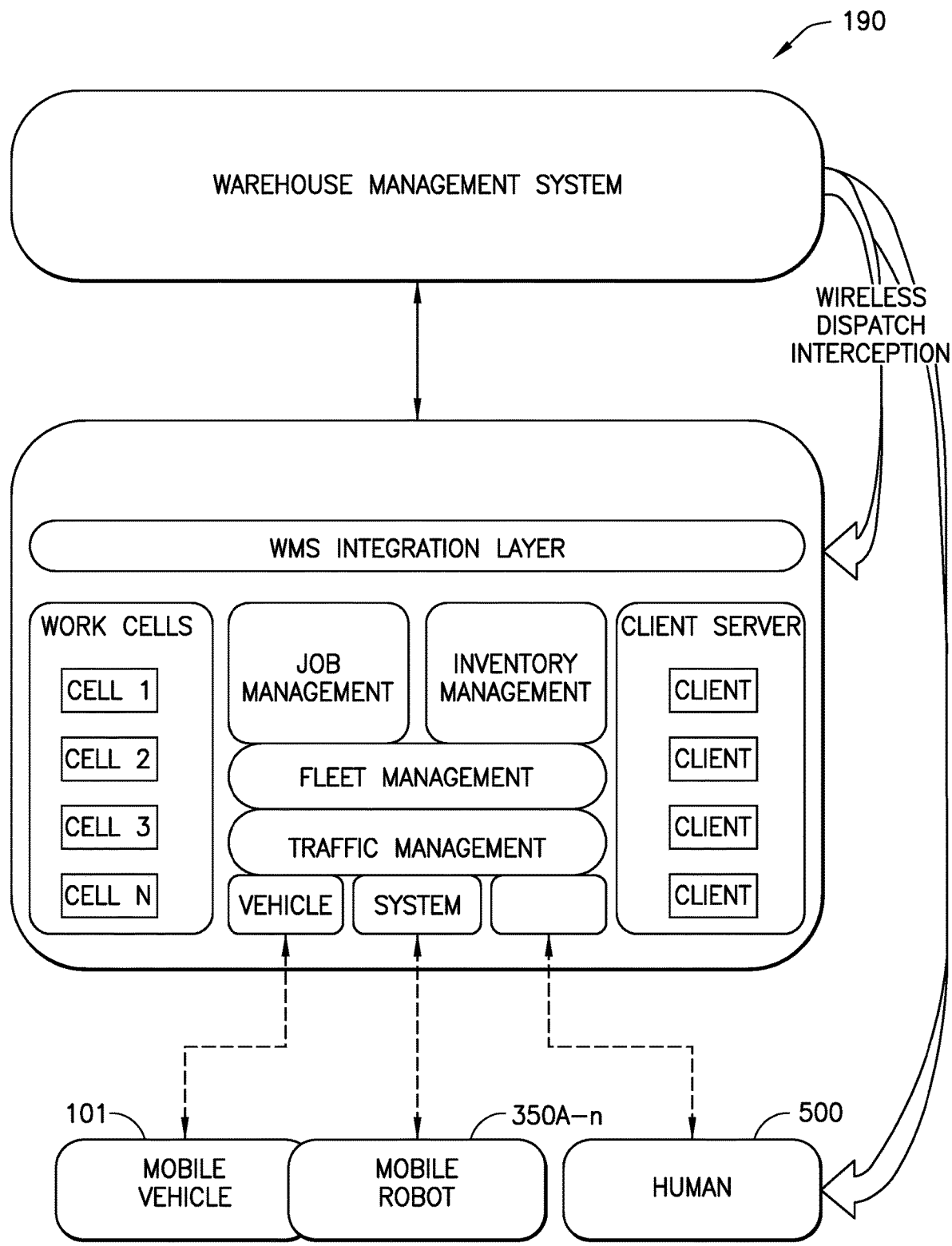
FIG. 10 is a schematic illustration of a facility controller of the logistic management system of FIG. 1 in accordance with aspects of the disclosed embodiments.

In one aspect, such as when the automated mobile robot bus interface 300 includes a mechatronic coupling, with the automated mobile robot 350A-n docked to the automated mobile vehicle 101 (FIG. 9, Block 3001), the mechatronic coupling operably couples the automated mobile robot 350A-n to a power source 114 (FIG. 9, Block 3002) so that automated mobile robot 350A-n charging is effected via the mechatronic coupling of the automated mobile robot bus interface 300 (i.e., the power source charging the automated mobile robot 350A-n is resident on automated mobile vehicle 101). In one aspect, the controller 113 may be operably coupled to the power source and the mechatronic coupling and configured so as to select a charging state between a charge reserved (FIG. 9, Block 3003) and a charge free state (FIG. 9, Block 3004). In the charge reserved state, the mechatronic coupling is configured to accept coupling and initiate charging of the automated mobile robot 350A-n associated with the automated mobile vehicle 101 and decline coupling with another automated mobile robot 351 unassociated with the automated mobile vehicle 101 (FIG. 9, Block 3005). In the charge free state, the mechatronic coupling is configured to charge the automated mobile robot 350A-n (FIG. 9, Block 3006). When the automated mobile robot 350A-n undocks from the automated mobile vehicle 101 (i.e., is uncoupled from the mechatronic coupling) (FIG. 9, Block 3007), the mechatronic coupling in the charge free state is configured to accept coupling of the other automated mobile robot 351 unassociated with the automated mobile vehicle 101 (FIG. 9, Block 3008) so as to charge the unassociated automated mobile robot 351 (FIG. 9, Block 3009). The controller 113 is configured to signal to each independent automated mobile robot 350A-n, 351 whether the charging state is in the charge reserved or charged free state, and communicates with the unassociated automated mobile robot 351 to accept coupling with the unassociated automated mobile robot 351 if in the charge free state.

In one aspect, the automated mobile vehicle 101 is configured so that the automated mobile vehicle 101 is operator navigable (e.g., driven by an operator throughout the travel area 198 and/or is operable in a semi-autonomous mode (i.e., the automated mobile vehicle 101 may follow a human packer 500 throughout the travel area 198)). In this aspect, the facility management controller 190 includes the human logistic module 193 which is configured to manage control of and communications with the human packers 500 of the commercial logistics facility 199, and identify human material handling tasks for the human packers 500. The human logistic module 193 and AMV module 192 of the facility management controller 190 may be communicably connected so that human material handling tasks, identified by the human logistic module 193, are indicated to a human packer 500.

For example, the automated mobile vehicle 101 may include an operator interface 170 that is communicably coupled (either wirelessly or through a wired coupling) to the controller 113 of the automated mobile vehicle 101. The operator interface 170 may be any suitable interface indication including, but not limited to, graphical user interfaces built in to the automated mobile vehicle 101, such as, a tablet computers, smart phones, and laptop computers. The operator interface 170 may be configured so as to signal, with the interface indication, an association of the human packer 500 with the automated mobile vehicle 101, and/or a human material handling characteristic, such as, palletizing or depalletizing the pallet 115 on the cargo bed 120. In one aspect, the human packer 500 may work alongside the automated mobile robot 350A-n and the operator interface 170 is disposed so that the indicated human material handling characteristic is related to the predetermined material handling characteristic of the automated mobile robot 350A-n. As such, that the human packer 500, based on the indicated human material handling characteristic, collaborates with the automated mobile robot 350A-n to complete a selected material handling task. The operator interface 170 may further include an input-output device 200 configured for operator control of the autonomous guided vehicle 100 (see FIG. 2B).

In one aspect, referring now to FIGS. 1, and 4-7, the commercial logistic facility 199 includes logistic or material handling stations 800 (e.g., for logistic articles such as storage arrays 801A-n, palletizer/depalletizer stations 802, conveyor infeed and/or outfeed stations 803, conveyance vehicle docks 804, etc.). The logistic or material handling stations 800 are distributed throughout the travel area 198 of the commercial logistic facility 199. The logistic or material handling stations 800 are disposed so as to form travel lanes or aisles 820, 821 between the logistic or material handling stations 800 so that each logistic or material handling stations 800 communicates with one or more other logistic or material handling stations 800 through the travel lanes or aisles 820, 821. Each of the logistic or material handling stations 800 includes at least one selectably variable undock location 850.

Figure 4:
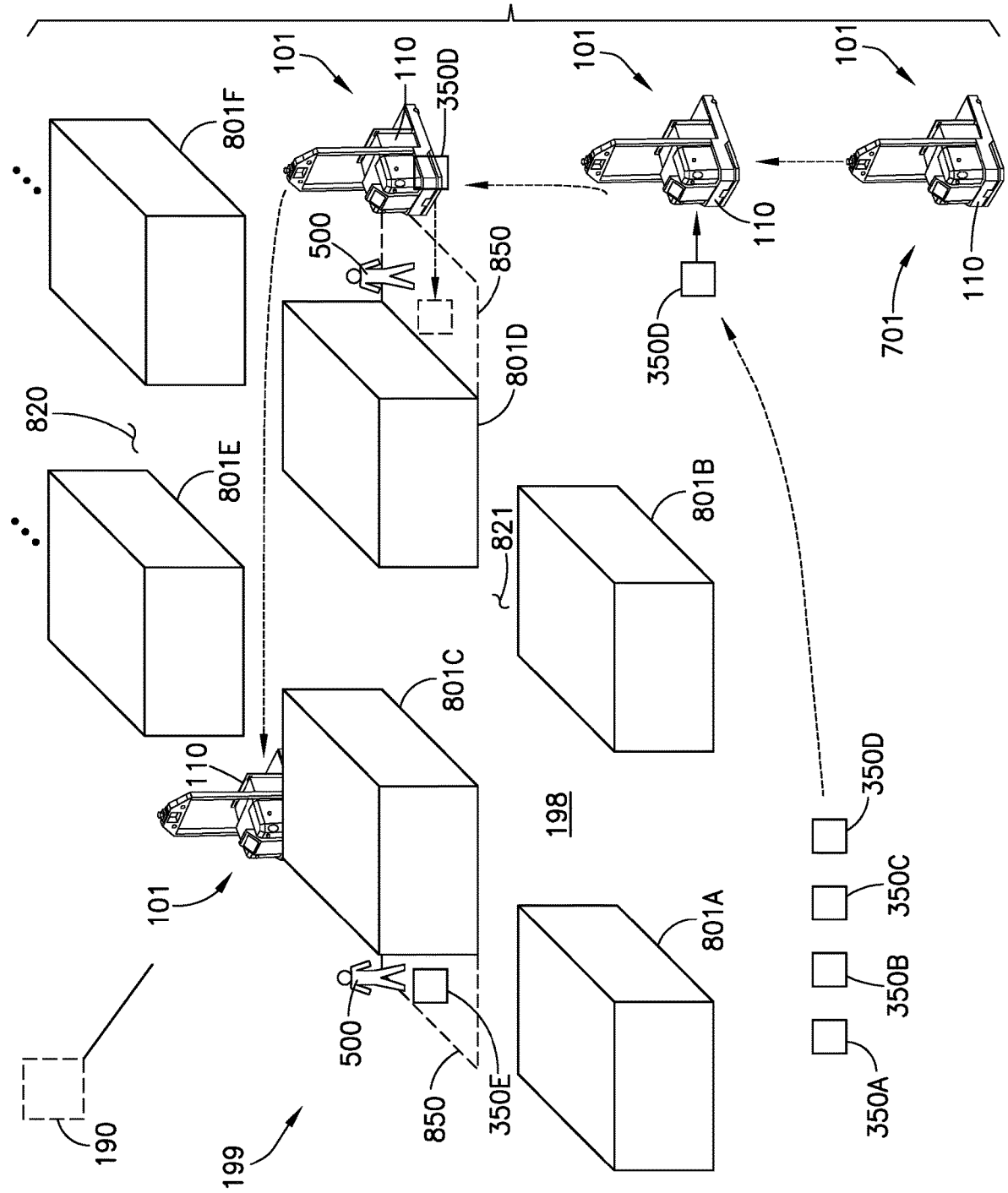
FIG. 4 is a schematic illustration of a portion of the logistic management system of FIG. 1 in accordance with aspects of the disclosed embodiments.
Figure 7:
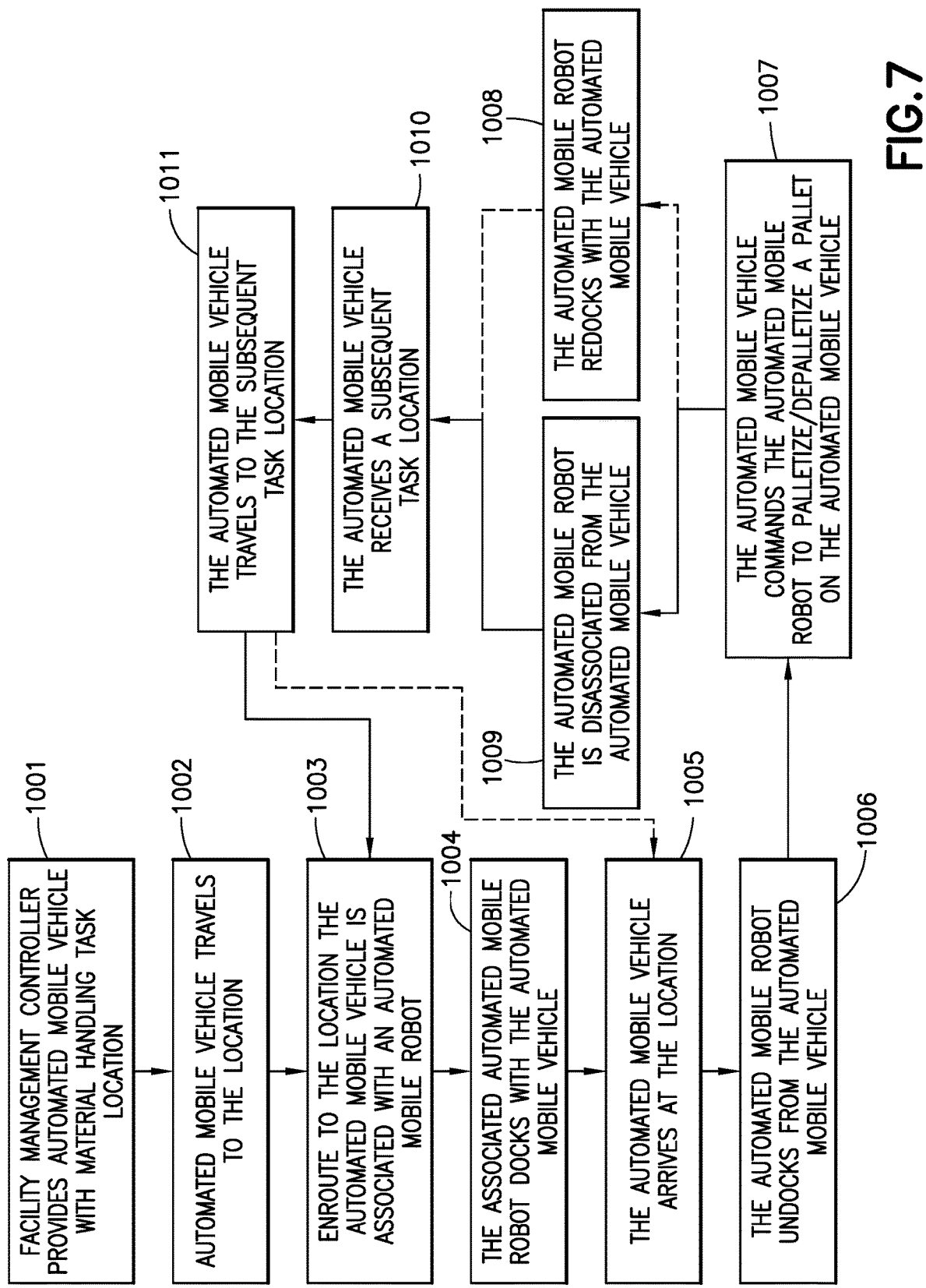
FIG. 7 is a flow diagram illustrating the logistic management system of FIG. 1 in accordance with aspects of the disclosed embodiments.

As described above, the facility management controller 190, together with the controller 113, is configured to implement material handling tasks at the logistic or material handling stations 800 throughout the commercial logistic facility 199, such as controlling and commanding palletizing/depalletizing of a pallet 115 on the cargo bed 120 at a storage array 801A-n. In order to facilitate the palletizing and depalletizing of the pallet 115, the facility management controller 190 sends and the controller 113 receives material handling instructions (FIG. 7; Block 1001). For example, as illustrated in FIG. 4, the facility management controller 190 may command the automated mobile vehicle 101 to move from a first location 701 and travel to a location where the material handling task is to be performed, e.g., storage array 801D (FIG. 7, Block 1002). En route to the material handling task, the controller 113 of the automated mobile vehicle 101 associates with the selected automated mobile robot 350D having a predetermined material handling characteristic related to the determined material handling task (FIG. 7, Block 1003). Upon reaching the selected automated mobile robot 350D, the selected automated mobile robot 350D docks with the automated mobile robot bus interface 300 of the automated mobile vehicle 101 (FIG. 7, Block 1004). Carrying the automated mobile robot 350D therewith, the automated mobile vehicle 101 moves to a selectably variable undock location 850 associated with, e.g., storage array 801D in the commercial logistic facility 199 (FIG. 7, Block 1005). In one aspect, the selectably variable undock location 850 is a location variable offset from the storage array 801D. In one aspect, the selectably variable undock location 850 is selected based on a predetermined material handling characteristic of the automated mobile robot 350D.

The controller 113 commands undocking of the automated mobile robot 350D so that the carried automated mobile robot 350D is undocked from the frame 110 at the selectably variable undock location 850 (FIG. 7, Block 1006). Undocked from the frame 110 of the automated mobile vehicle 101, the undocked automated mobile robot 350D moves as a unit autonomously, independent from the automated mobile vehicle 101, from the selectably variable undock location 850 to the storage array 801D to perform the material handling task assigned (FIG. 7, Block 1007). For example, in one aspect, the controller 113 is configured to manage control so that the automated mobile robot 350D undocked engages, at the selectably variable undock location 850, part of the pallet 115 supported on the cargo bed 120. The automated mobile robot 350D may engage the pallet 115 with a robot arm and moves the part to or from the pallet 115 to construct and/or deconstruct the pallet 115 effecting palletizing and depalletizing the pallet 115 on the cargo bed 120. In one aspect, the controller 113 is configured to manage control so that movement of the part to construct and/or deconstruct the pallet 115 is effected at least in part via unit movement of the undocked automated mobile robot 350D from the selectably variable undock location 850 to the storage array 801D.

Upon completion of the commanded task, the controller 113 of the automated mobile vehicle 101 may send a task completed signal to the facility management controller 190 for closing the task (i.e., marking the task complete). Upon registering that the commanded material handling task is complete, the facility management controller 190 may effect reassignment of the automated mobile vehicle 101 to a subsequent material handling task (FIG. 7, Block 1010). The automated mobile robot 350D may redock with the automated mobile vehicle 101 to perform the subsequent material handling task (FIG. 7, Block 1008), or the controller 113 may dissociate the automated mobile robot 350D (FIG. 7, Block 1009) and associate with another of the different independent automated mobile robots 350A-n, based on the subsequent material handling task assigned to the automated mobile vehicle 101. The automated mobile vehicle travels to the different independent automated mobile robot 350A-n or with the redocked automated mobile robot 350D travels to the subsequent material handling task (FIG. 7, Block 1011). The different independent automated mobile robot 350A-n, in response to the command and communication of the controller 113 of the automated mobile vehicle 101, selectably docks the automated mobile vehicle 101 in place of the undocked automated mobile robot 350D.

Figure 5:
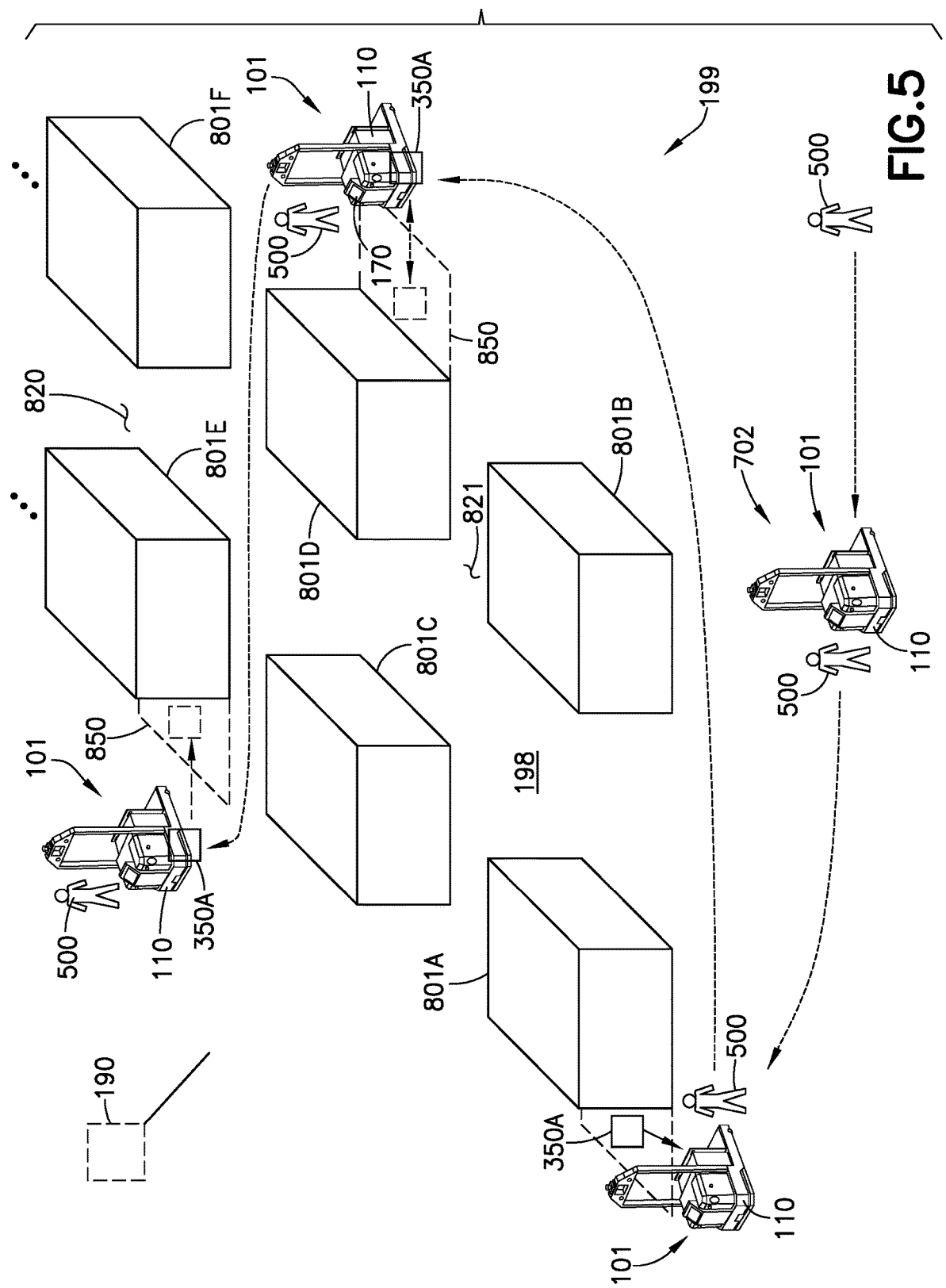
FIG. 5 is a schematic illustration of a portion of the logistic management system of FIG. 1 in accordance with aspects of the disclosed embodiments.
Figure 6:
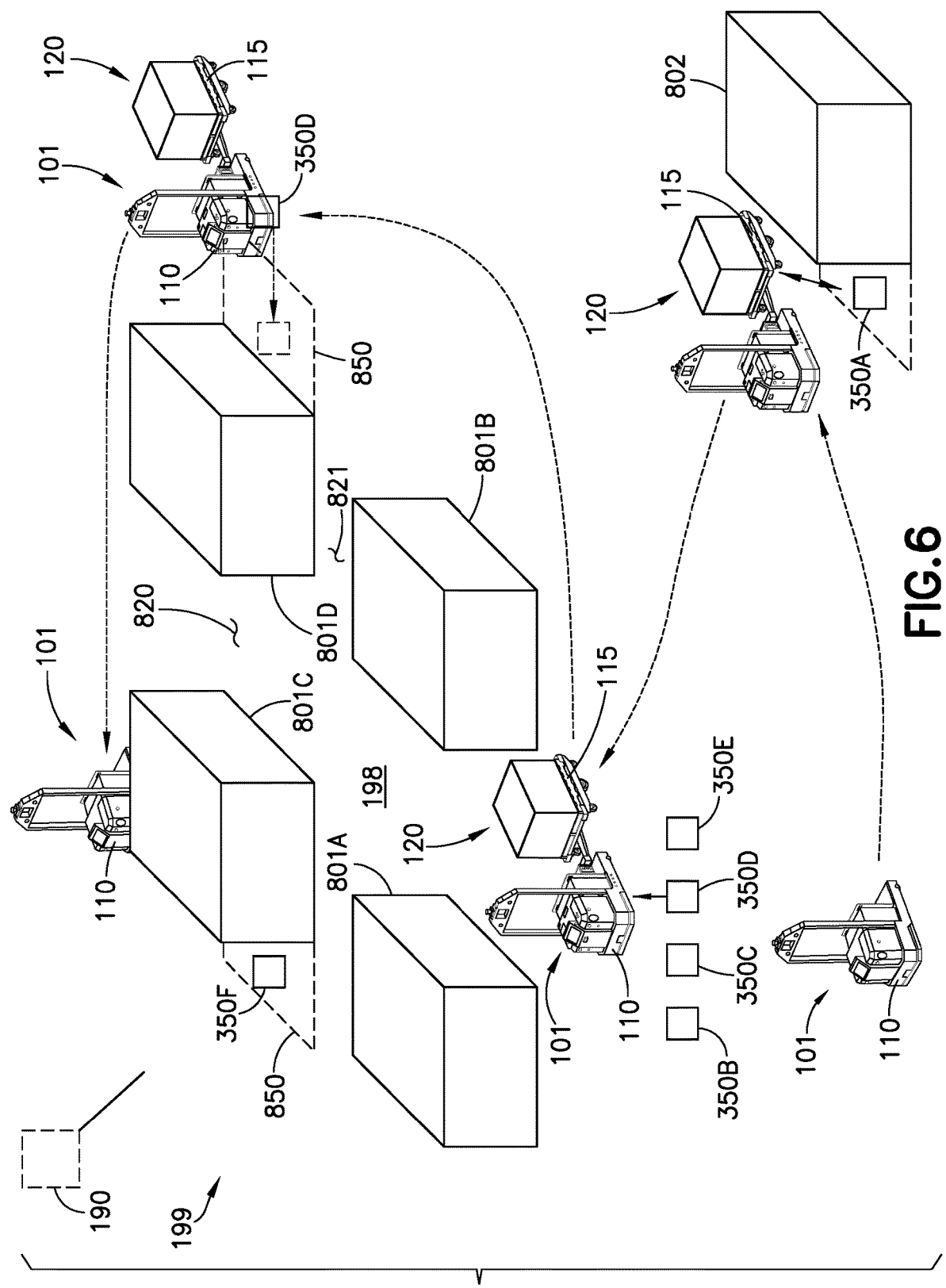
FIG. 6 is a schematic illustration of a portion of the logistic management system of FIG. 1 in accordance with aspects of the disclosed embodiments.
Figure 8:
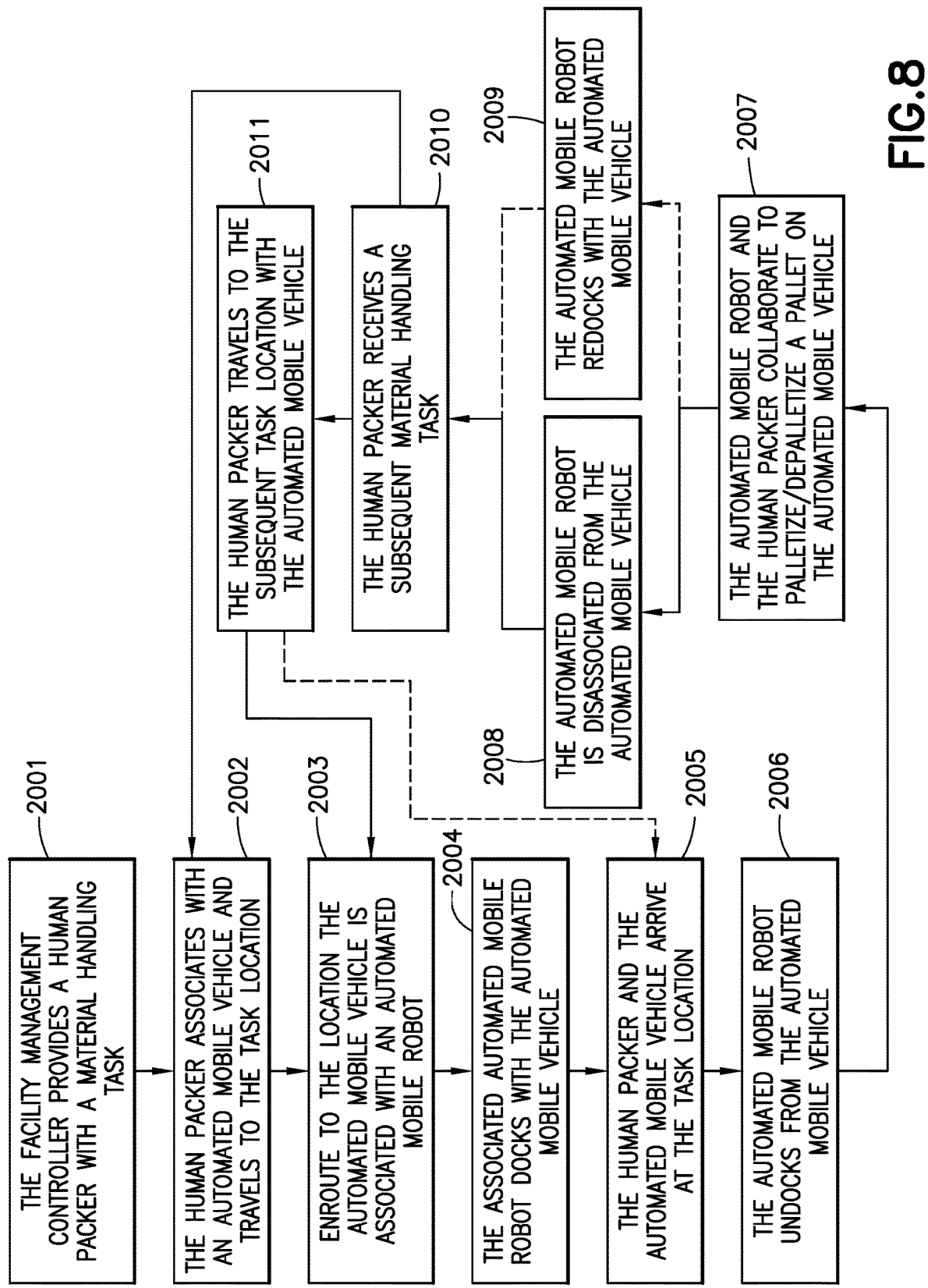
FIG. 8 is a flow diagram illustrating the logistic management system of FIG. 1 in accordance with aspects of the disclosed embodiments.

In another aspect, referring to FIGS. 1, 5, and 8, the facility management controller 190 may send material handling instructions to a human packer 500 (FIG. 8; Block 2001). The facility management controller 190 may associate the human packer 500 with an automated mobile vehicle 101 to move from a first location 702 and travel to a location where the material handling task is to be performed, e.g., storage array 801D (FIG. 8, Block 2002). En route to the material handling task, the controller 113 of the automated mobile vehicle 101 associates with the selected automated mobile robot 350A having a predetermined material handling characteristic related to the determined material handling task (FIG. 8, Block 2003). Upon reaching the selected automated mobile robot 350A, the selected automated mobile robot 350A may discontinue or complete a current task that the selected automated mobile robot 350A is performing and dock with the automated mobile robot bus interface 300 of the automated mobile vehicle 101 (FIG. 8, Block 2004). Carrying the automated mobile robot 350A therewith, the automated mobile vehicle 101 and human packer 500 move to, e.g., storage array 801D (FIG. 8, Block 2005).

The controller 113 commands undocking of the automated mobile robot 350A so that the carried automated mobile robot 350A is undocked from the frame 110 at the selectably variable undock location 850 of storage array 801D (FIG. 8, Block 2006). Undocked from the frame 110 of the automated mobile vehicle 101, the undocked automated mobile robot 350A and the human packer 500 move from the selectably variable undock location 850 to the storage array 801D to perform the material handling task assigned (FIG. 8, Block 2007). For example, in one aspect, the facility management controller 190, via the human logistic module 193, manages control of and communications with the human packer 500 and identifies to the human packer 500 a human material handling task (the task may be indicated to the human packer 500 via the operator interface 170 on the automated mobile vehicle 101). In one aspect, the identified human material handling task collaborates with the material handling task of the automated mobile robot 350A, such as, to collaboratively construct and/or deconstruct the pallet 115 effecting palletizing and depalletizing the pallet 115 on the cargo bed 120, Upon completion of the commanded task, the controller 113 of the automated mobile vehicle 101 may send a task completed signal to the facility management controller 190 for closing the task (i.e., marking the task complete).

Upon registering that the commanded material handling task is complete, the facility management controller 190 may effect reassignment of the human packer 500 and the automated mobile vehicle 101 to a subsequent material handling task (FIG. 8, Block 2010). The automated mobile robot 350A may redock with the automated mobile vehicle 101 to perform the subsequent material handling task (FIG. 8, Block 2009), or the controller 113 may dissociate the automated mobile robot 350A (FIG. 8, Block 2008) and associate with another of the different independent automated mobile robots, based on the subsequent material handling task assigned to the automated mobile vehicle 101. The human packer 500 and the automated mobile vehicle may travel to the different independent automated mobile robot 350A-n or with the redocked automated mobile robot 350A travels to the subsequent material handling task (FIG. 8, Block 2011). The different independent automated mobile robot 350A-n, in response to the command and communication of the controller 113 of the automated mobile vehicle 101, selectably docks the automated mobile vehicle 101 in place of the undocked automated mobile robot 350A.

What is claimed is:

1. An automated mobile vehicle comprising:
   a frame having a pallet bed for a pallet on the automated mobile vehicle, and an automated mobile robot bus, separate and distinct from the pallet bed;
   a drive section coupled to the frame and configured so as to provide automated vehicle mobility of the automated mobile vehicle; and
   a controller operably coupled to the drive section so as to effect therewith automated vehicle mobility;
   wherein, the automated mobile robot bus has a bus interface for docking an independent automated mobile robot to the frame so that the independent automated mobile robot docked to the frame is carried by the frame with movement of the automated mobile vehicle, wherein the independent automated mobile robot has independent automated mobility so that undocked from the frame the independent automated mobile robot is free to roam independent from the automated mobile vehicle, and wherein the automated mobile robot is fungible for docking with the frame from a number of different independent automated mobile robots, each being articulated to effect, independent from the automated mobile vehicle, a predetermined material handling characteristic palletizing and/or depalletizing the pallet on the pallet bed within a storage array in a logistic or manufacturing facility; and
   wherein the controller is coupled via the bus interface to the automated mobile robot, and is configured to manage control of palletizing and/or depalletizing of the pallet on the pallet bed with the automated mobile robot undocked from the frame and moving as a unit apart from and between the frame and a storage array in the logistic or manufacturing facility.

2. The automated mobile vehicle of claim 1, wherein the controller is configured so as to control palletizing and/or depalletizing with the automated mobile robot and the pallet seated on the pallet bed.

3. The automated mobile vehicle of claim 1, wherein the controller is configured to control palletizing and/or depalletizing so as to move the automated mobile vehicle, carrying the automated mobile robot therewith, to a selectably variable undock location, with selectably variable offset from the storage array, and command undocking of the automated mobile robot so that the carried robot is undocked from the frame at the selectably variable undock location, the selectably variable undock location being selected based on the predetermined material handling characteristic of the robot, and the undocked robot moves as a unit autonomously, independent from the automated mobile vehicle, from the undock location to the storage array.

4. The automated mobile vehicle of claim 3, wherein the controller is configured to manage control so that the automated mobile robot undocked engages, at the undock location, part of the pallet on the pallet bed with a robot arm and moves the part to or from the pallet to construct and/or deconstruct the pallet effecting palletizing and depalletizing the pallet on the pallet bed.

5. The automated mobile vehicle of claim 4, wherein the controller is configured to manage control so that movement of the part to construct and/or deconstruct the pallet is effected at least in part via unit movement of the undocked automated mobile robot from the undock location to the storage array.

6. The automated mobile vehicle of claim 1, wherein the pallet bed has more than one pallet holding location for simultaneously holding more than one pallet on the pallet bed.

7. The automated mobile vehicle of claim 6, wherein the controller is configured to manage control of palletizing one pallet on the pallet bed, and depalletizing another pallet on the pallet bed with the automated mobile robot.

8. The automated mobile vehicle of claim 1, wherein the controller is configured so as to associate the automated mobile robot, from the different independent automated mobile robots, with the automated mobile vehicle based on the predetermined material handling characteristic of the automated mobile robot.

9. The automated mobile vehicle of claim 8, wherein the predetermined material handling characteristic is a material handling task identified, by a manager system of the logistic or manufacturing facility, to the controller of the mobile vehicle.

10. The automated mobile vehicle of claim 1, wherein the controller is configured so as to associate the automated mobile robot, from the different independent automated mobile robots, with the automated mobile vehicle based on a task assigned to the automated mobile vehicle, in the logistic and manufacturing facility, and to dissociate the automated mobile robot and associate with another of the different independent automated mobile robots, based on another task assigned to the automated mobile vehicle.

11. The automated mobile vehicle of claim 1, wherein the bus interface has a mechanical coupling dependent from the frame disposed so as to engage the automated mobile robot and couple the automated mobile robot to the frame for carrying the automated mobile robot with the automated mobile vehicle.

12. The automated mobile vehicle of claim 1, wherein the bus interface has a mechatronic coupling operably coupling the automated mobile robot to a power source so that automated mobile robot charging is effected via the mechatronic coupling of the bus interface.

13. The automated mobile vehicle of claim 12, wherein the power source charging the automated mobile robot is resident on automated mobile vehicle.

14. The automated mobile vehicle of claim 13, wherein the controller is operably coupled to the power source and the mechatronic coupling and configured so as to select a charging state between a charge reserved and a charge free state, wherein in the charge reserved state, the mechatronic coupling is configured to accept coupling and initiate charge of the automated mobile robot associated with the automated mobile vehicle and decline coupling with another automated mobile robot unassociated with the automated mobile vehicle, and in the charge free state, the mechatronic coupling is configured to accept coupling of the other automated mobile robot unassociated with the automated mobile vehicle.

15. The automated mobile vehicle of claim 13, wherein the controller is configured to signal whether the charging state is in the charge reserved or charged free state, and communicates with the unassociated automated mobile robot to accept coupling with the unassociated automated mobile vehicle if in the charge free state.

16. The automated mobile vehicle of claim 1, further comprising a human interface operably coupled to the controller, the human interface being configured with features identifying to a human packer in the logistic or manufacturing facility an association with the automated mobile vehicle, and a human material handling characteristic palletizing or depalletizing the pallet on the pallet bed.

17. The automated mobile vehicle of claim 16, wherein the human interface is configured so as to signal, with an interface indication, the association of the human packer with the automated mobile vehicle, and/or the human material handling characteristic palletizing or depalletizing the pallet on the pallet bed.

18. The automated mobile vehicle of claim 17, wherein the human interface is disposed so that the indicated human material handling characteristic is related to the predetermined material handling characteristic of the automated mobile robot so that the human packer based on the indicated human material handling characteristic collaborates with the automated mobile robot palletizing or depalletizing the pallet on the pallet bed.

19. A logistics management system for a logistic or manufacturing facility, the system comprising:
at least one automated mobile vehicle, each with a cargo bed, configured for holding a pallet cargo, and having a drive and control system disposed to effect autonomous vehicle mobility of each of the at least one automated mobile vehicle in the logistic or manufacturing facility, wherein the at least one automated mobile vehicle has a bus interface for docking with the at least one automated mobile vehicle, an automated mobile robot, from a number of different fungible automated mobile robots, each having automated mobility, as a mobile unit, independent of the at least one automated mobile vehicle, and an articulation configured for extension and retraction moves for material handling; and
a facility management controller configured to manage logistic execution and/or material handling tasks, and has an automated mobile vehicle module managing control and communicably coupled to the control system of each of the at least one automated mobile vehicle so as to command the at least one automated mobile vehicle to perform, at a facility location, a material handling task effecting at least one of palletizing and depalletizing of pallet cargo on the bed;
wherein the facility management controller is configured to associate, based on the material handling task commanded, the automated mobile robot with the at least one automated mobile vehicle, and the control system of the at least one automated mobile vehicle is configured so that in response to the command and communication of the associated automated mobile robot, the at least one automated mobile vehicle selectably docks the associated automated mobile robot to the bus interface, transports the docked automated mobile robot from a first location to the facility location, different from the first location, and undocks at the facility location the automated mobile robot from the at least one automated mobile vehicle so as to perform the commanded material handling task with the undocked automated mobile robot separated from the at least one automated mobile vehicle.

20. The automated mobile vehicle of claim 19, wherein the facility management controller is configured so that upon registering that the commanded material handling task is complete, the facility management controller associates another of the different automated mobile robots with the at least one automated mobile vehicle, based on another material handling command by the facility management controller to the at least one automated mobile vehicle, and the control system in response to the other command and communication of the other associated automated mobile vehicle, selectably docks the at least automated mobile vehicle with the other associated automated mobile vehicle, at the bus interface, in place of the undocked automated mobile robot.

21. The automated mobile vehicle of claim 19, wherein the facility management controller has a communication interface configured for communicably coupling each of the fungible automated mobile robots with the facility management controller so that signal and data communications from each automated mobile robot are linked to the automated mobile vehicle module of the facility management controller.

22. The automated mobile vehicle of claim 19, further comprising another automated mobile vehicle with a cargo bed for pallet cargo, communicably coupled to the automated mobile vehicle module of the facility management controller so that the automated mobile vehicle module commands other material handling tasks of the other automated mobile vehicle, wherein at least one of the other material handling tasks effects at least one of palletizing and depalletizing and is performed by the undocked automated mobile robot separated from the at least one automated mobile vehicle.

23. The automated mobile vehicle of claim 19, wherein the facility management controller has a human logistic module managing control of and communications with human packers of the logistics or manufacturing facility, and identifying human material handling tasks for the human packers, and the human logistic and automated mobile vehicle modules are communicably connected so that at least one human material handling task identified by the human logistic module, is indicated to a human packer via a human interface on the automated mobile vehicle and the identified at least one human material handling task collaborates with the material handling task of the automated mobile robot in palletizing and depalletizing the pallet cargo on the cargo bed.

24. A method comprising:
providing a frame of an automated mobile vehicle, the frame having a pallet bed for a pallet, and an automated mobile robot bus having a bus interface, separate and distinct from the pallet bed;
providing a drive section coupled to the frame and configured so as to provide automated vehicle mobility of the automated mobile vehicle; and
providing a controller operably coupled to the drive section so as to effect therewith automated vehicle mobility;
docking an independent automated mobile robot to the frame via the bus interface so that the independent automated mobile robot docked to the frame is carried by the frame with movement of the automated mobile vehicle, wherein the independent automated mobile robot has independent automated mobility so that undocked from the frame the independent automated mobile robot is free to roam independent from the automated mobile vehicle, and wherein the automated mobile robot is fungible for docking with the frame from a number of different independent automated mobile robots, each being articulated to effect, independent from the automated mobile vehicle, a predetermined material handling characteristic palletizing and/or depalletizing the pallet on the pallet bed within a storage array in a logistic or manufacturing facility; and
managing control, with the controller coupled via the bus interface to the automated mobile robot, of palletizing and/or depalletizing of the pallet on the pallet bed with the automated mobile robot undocked from the frame and moving as a unit apart from and between the frame and a storage array in the logistic or manufacturing facility.

25. The method of claim 24, wherein the controller controls palletizing and/or depalletizing with the automated mobile robot and the pallet seated on the pallet bed.

26. The method of claim 24, further comprising effecting, with the controller, palletizing and/or depalletizing so as to move the automated mobile vehicle, carrying the automated mobile robot therewith, to a selectably variable undock location, with selectably variable offset from the storage array, and commanding undocking of the automated mobile robot so that the carried robot is undocked from the frame at the selectably variable undock location, the selectably variable undock location being selected based on the predetermined material handling characteristic of the robot, and the undocked robot moves as a unit autonomously, independent from the automated mobile vehicle, from the undock location to the storage array.

27. The method of claim 26, wherein the controller manages control so that the automated mobile robot undocked engages, at the undock location, part of the pallet on the pallet bed with a robot arm and moves the part to or from the pallet to construct and/or deconstruct the pallet effecting palletizing and depalletizing the pallet on the pallet bed.

28. The method of claim 27, wherein the controller manages control so that movement of the part to construct and/or deconstruct the pallet is effected at least in part via unit movement of the undocked automated mobile robot from the undock location to the storage array.

29. The method of claim 24, wherein the pallet bed has more than one pallet holding location for simultaneously holding more than one pallet on the pallet bed.

30. The method of claim 29, wherein the controller manages control of palletizing one pallet on the pallet bed, and depalletizing another pallet on the pallet bed with the automated mobile robot.

31. The method of claim 24, further comprising associating, with the controller, the automated mobile robot, from the different independent automated mobile robots, with the automated mobile vehicle based on the predetermined material handling characteristic of the automated mobile robot.

32. The method of claim 31, wherein the predetermined material handling characteristic is a material handling task identified, by a manager system of the logistic or manufacturing facility, to the controller of the mobile vehicle.

33. The method of claim 24, further comprising associating, with the controller, the automated mobile robot, from the different independent automated mobile robots, with the automated mobile vehicle based on a task assigned to the automated mobile vehicle, in the logistic and manufacturing facility, and to dissociate the automated mobile robot and associate with another of the different independent automated mobile robots, based on another task assigned to the automated mobile vehicle.

34. The method of claim 24, wherein the bus interface has a mechanical coupling dependent from the frame disposed so as to engage the automated mobile robot and couple the automated mobile robot to the frame for carrying the automated mobile robot with the automated mobile vehicle.

35. The method of claim 24, wherein the bus interface has a mechatronic coupling operably coupling the automated mobile robot to a power source so that automated mobile robot charging is effected via the mechatronic coupling of the bus interface.

36. The method of claim 35, wherein the power source charging the automated mobile robot is resident on automated mobile vehicle.

37. The method of claim 36, further comprising selecting, with the controller operably coupled to the power source and the mechatronic coupling, a charging state between a charge reserved and a charge free state, wherein in the charge reserved state, the mechatronic coupling accepts coupling and initiates charge of the automated mobile robot associated with the automated mobile vehicle and declines coupling with another automated mobile robot unassociated with the automated mobile vehicle, and in the charge free state, the mechatronic coupling accepts coupling of the other automated mobile robot unassociated with the automated mobile vehicle.

38. The method of claim 36, further comprising signaling, with the controller, whether the charging state is in the charge reserved or charged free state, and communicating with the unassociated automated mobile robot to accept coupling with the unassociated automated mobile robot if in the charge free state.

39. The method of claim 24, further comprising identifying, with a human interface operably coupled to the controller, to a human packer in the logistic or manufacturing facility an association with the automated mobile vehicle, and a human material handling characteristic palletizing or depalletizing the pallet on the pallet bed.

40. The method of claim 39, further comprising signaling, with an interface indication of the human interface, the association of the human packer with the automated mobile vehicle, and/or the human material handling characteristic palletizing or depalletizing the pallet on the pallet bed.

41. The method of claim 40, wherein the human interface is disposed so that the indicated human material handling characteristic is related to the predetermined material handling characteristic of the automated mobile robot so that the human packer based on the indicated human material handling characteristic collaborates with the automated mobile robot palletizing or depalletizing the pallet on the pallet bed.

42. A method for managing a logistic or manufacturing facility with a logistics management system, the method comprising:
providing at least one automated mobile vehicle, each with a cargo bed, configured for holding a pallet cargo, and having a drive and control system disposed to effect autonomous vehicle mobility of each of the at least one automated mobile vehicle in the logistic or manufacturing facility, wherein the at least one automated mobile vehicle has a bus interface for docking with the at least one automated mobile vehicle, an automated mobile robot, from a number of different fungible automated mobile robots, each having automated mobility, as a mobile unit, independent of the at least one automated mobile vehicle, and an articulation configured for extension and retraction moves for material handling; and
providing a facility management controller configured to manage logistic execution and/or material handling tasks, and has an automated mobile vehicle module managing control and communicably coupled to the control system of each of the at least one automated mobile vehicle so as to command the at least one automated mobile vehicle to perform, at a facility location, a material handling task effecting at least one of palletizing and depalletizing of pallet cargo on the bed;
associating, with the facility management controller, based on the material handling task commanded, the automated mobile robot with the at least one automated mobile vehicle, and the control system of the at least one automated mobile vehicle is configured so that in response to the command and communication of the associated automated mobile robot, the at least one automated mobile vehicle selectably docks the associated automated mobile robot to the bus interface, transports the docked automated mobile robot from a first location to the facility location, different from the first location, and undocks at the facility location the automated mobile robot from the at least one automated mobile vehicle so as to perform the commanded material handling task with the undocked automated mobile robot separated from the at least one automated mobile vehicle.

43. The method of claim 42, wherein upon registering that the commanded material handling task is complete, the method further comprising associating, with the facility management controller, another of the different automated mobile robots with the at least one automated mobile vehicle, based on another material handling command by the facility management controller to the at least one automated mobile vehicle, and the control system in response to the other command and communication of the other associated automated mobile vehicle, selectably docks the at least automated mobile vehicle with the other associated automated mobile vehicle, at the bus interface, in place of the undocked automated mobile robot.

44. The method of claim 42, further comprising communicably coupling, via a communication interface of the facility management controller, each of the fungible automated mobile robots with the facility management controller so that signal and data communications from each automated mobile robot are linked to the automated mobile vehicle module of the facility management controller.

45. The method of claim 42, wherein another automated mobile vehicle with a cargo bed for pallet cargo is communicably coupled to the automated mobile vehicle module of the facility management controller, and the automated mobile vehicle module commands other material handling tasks of the other automated mobile vehicle, wherein at least one of the other material handling tasks effects at least one of palletizing and depalletizing and is performed by the undocked automated mobile robot separated from the at least one automated mobile vehicle.

46. The method of claim 42, further comprising managing control of and communicating with human packers of the logistics or manufacturing facility with a human logistic module of the facility management controller, and identifying human material handling tasks for the human packers, wherein the human logistic and automated mobile vehicle modules are communicably connected so that at least one human material handling task identified by the human logistic module, is indicated to a human packer via a human interface on the automated mobile vehicle and the identified at least one human material handling task collaborates with the material handling task of the automated mobile robot in palletizing and depalletizing the pallet cargo on the cargo bed.

* * * * *